United States Patent
Kwack et al.

(10) Patent No.: US 9,459,409 B2
(45) Date of Patent: Oct. 4, 2016

(54) OPTICAL COUPLING DEVICE

(71) Applicant: ELECTRONICS AND TELECOMMUNICATIONS RESEARCH INSTITUTE, Daejeon (KR)

(72) Inventors: Myungjoon Kwack, Gimpo (KR); Gyungock Kim, Daejeon (KR); Jaegyu Park, Daejeon (KR); Ki Seok Jang, Daejeon (KR); Jiho Joo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/820,406

(22) Filed: Aug. 6, 2015

(65) Prior Publication Data

US 2016/0259126 A1 Sep. 8, 2016

(30) Foreign Application Priority Data

Mar. 3, 2015 (KR) .................. 10-2015-0029818

(51) Int. Cl.
*G02B 6/12* (2006.01)
*G02B 6/30* (2006.01)
*G02B 6/36* (2006.01)

(52) U.S. Cl.
CPC .............. *G02B 6/30* (2013.01); *G02B 6/3616* (2013.01)

(58) Field of Classification Search
CPC ................. G02B 6/30; G02B 6/3616
USPC ............................................ 385/14
See application file for complete search history.

(56) References Cited

U.S. PATENT DOCUMENTS

| | | | |
|---|---|---|---|
| 6,328,482 B1 | 12/2001 | Jian | |
| 7,914,210 B2 | 3/2011 | Schweiker | |
| 2011/0243507 A1 | 10/2011 | Kim et al. | |
| 2012/0121218 A1* | 5/2012 | Kim | G02B 6/4292 385/14 |

OTHER PUBLICATIONS

Ooyagi et al., "Ultra Compact OIE Module for Optical Interconnection", Proceedings of 17th Microoptics Conference (MOC' 11), Oct. 30-Nov. 2, 2011, pp. 1-2, vol. H-31, The Japan Society of Applied Physics, Sendai, Japan.

* cited by examiner

*Primary Examiner* — Jerry Blevins

(57) ABSTRACT

An optical coupling device comprises an optical fiber block including a first block part and a second block part contacting with one side of the first block part, an optical fiber penetrating the optical fiber block and having an end surface exposed at a bottom surface of the optical fiber block, a semiconductor chip disposed below the optical fiber block and having an optical input/output element disposed on a top surface of the semiconductor chip to correspond with the end surface of the optical fiber, and a planarization layer disposed on the top surface of the semiconductor chip and having a recess region. A bottom surface of the first block part has a higher level than that of the second block part. The bottom surface of the second block part contacts with a bottom of the recess region. The optical fiber is optically coupled with the optical input/output element.

20 Claims, 16 Drawing Sheets

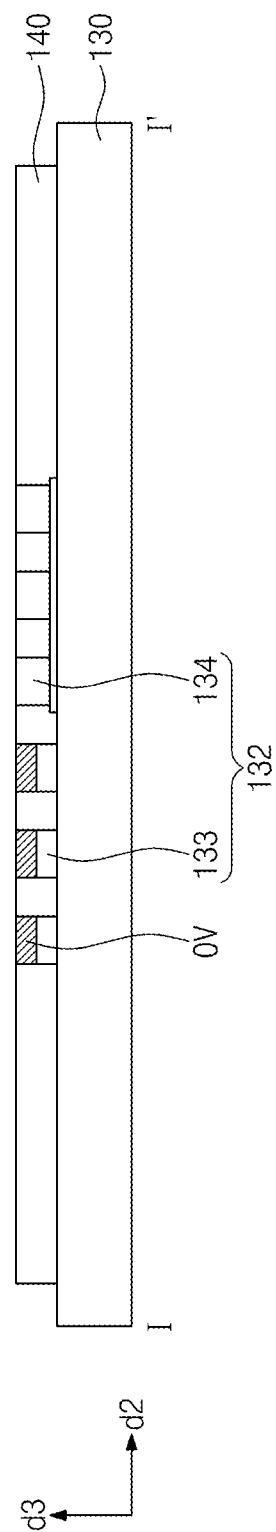

OPTICAL COUPLING DEVICE

CROSS-REFERENCE TO RELATED APPLICATIONS

This U.S. non-provisional patent application claims priority under 35 U.S.C. §119 of Korean Patent Application No. 10-2015-0029818, filed on Mar. 3, 2015, the entire contents of which are hereby incorporated by reference.

BACKGROUND

The present disclosure herein relates to an optical coupling device, and more particularly, to an optical coupling device for implementing passive optical coupling by using a physical structure of an optical fiber block and a planarization layer.

Recently, as a method of processing large amounts of data at high speed, an optical interconnection technology receives attention. In general, an optical coupling device includes optical fiber and an optical input/output element as a basic configuration and it is important that an optical coupling therebetween has high efficiency/low loss. When a multi channel array of optical fiber and an optical input/output element is applied in order to increase the transmission amount of data, a plurality of optical fibers and a plurality of optical input/output elements are required to be collectively optical-axis aligned. In this case, since task times and costs may be increasing with an active alignment method, it is preferred to use a passive alignment method.

SUMMARY

The present disclosure provides a miniaturized optical coupling device.

The present disclosure also provides a miniaturized optical coupling device of which optical coupling process is simplified and manufacturing cost is reduced.

An embodiment of the inventive concept provides optical coupling devices including: an optical fiber block including a first block part and a second block part contacting with one side of the first block part; an optical fiber penetrating the optical fiber block and having an end surface exposed at a bottom surface of the optical fiber block; a semiconductor chip disposed below the optical fiber block and having an optical input/output element disposed on a top surface of the semiconductor chip to correspond with the end surface of the optical fiber; and a planarization layer disposed on the top surface of the semiconductor chip and having a recess region, wherein a bottom surface of the first block part has a higher level than a bottom surface of the second block part from a bottom surface of the semiconductor chip, the bottom surface of the second block part contacts with a bottom of the recess region, and the optical fiber is optically coupled with the optical input/output element.

In an embodiment, the optical fiber may penetrate the first block part and the end surface of the optical fiber may have the same level as the bottom surface of the first block part.

In an embodiment, the optical input/output element may be adjacent to the recess region and may be spaced apart from the recess region, in a plan view.

In an embodiment, the second block part may include: an upper portion disposed at a higher level than the bottom surface of the first block part; and a lower portion disposed at a lower level than the bottom surface of the first block part, wherein the recess region may include an alignment region having a structure engaging with the lower portion of the second block part.

In an embodiment, an inner sidewall of the alignment region may contact with a sidewall of the lower portion of the second block part.

In an embodiment, the recess region may further include an additional region extending from the alignment region, the additional region may have a tapered shape of which width becomes broader as it becomes far from the alignment region, in a plan view.

In an embodiment, the end surface of the optical fiber may have the same level as the bottom surface of the second block part.

In an embodiment, the optical input/output element may overlap the recess region, in a plan view.

In an embodiment, the second bock part may include: an upper portion disposed at a higher level than the bottom surface of the first block part; and a lower portion disposed at a lower level than the bottom surface of the first block part, wherein the recess region may include an alignment region having a structure engaging with the lower portion of the second block part and a portion of the optical fiber protruding from the bottom surface of the first block part.

In an embodiment, an inner sidewall of the alignment region may contact with a sidewall of the lower portion of the second block part and a sidewall of the optical fiber.

In an embodiment, the recess region may further include an additional region extending from the alignment region; the additional region may have a tapered shape of which width becomes broader as it becomes far from the alignment region, in a plan view.

In an embodiment, the bottom surface of the first block part may contact with a top surface of the planarization layer.

In an embodiment, the end surface of the optical fiber may contact with the optical input/output element.

In an embodiment, the optical coupling devices may further include an optical via pattern disposed between the end surface of the optical fiber and the optical input/output element, wherein the optical via pattern may include a material having a higher refractive index than that of the planarization layer.

In an embodiment, the second block part may include: an upper portion disposed at a higher level than the bottom surface of the first block part; and a lower portion disposed at a lower level than the bottom surface of the first block part, wherein the lower portion may be inserted into the recess region.

In an embodiment, at least a portion of a sidewall of the lower portion may contact with an inner sidewall of the recess region.

In an embodiment, the optical coupling devices may further include a fixing part covering a top surface of the planarization layer and a sidewall of the optical fiber block.

In an embodiment, the optical fiber includes an optical fiber array arranged in a line and the optical input/output element may include an optical input/output element array corresponding to the optical fiber array.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 3B is a sectional view taken along a line I-I' of FIG. 3A;

DETAILED DESCRIPTION

Figure 1:
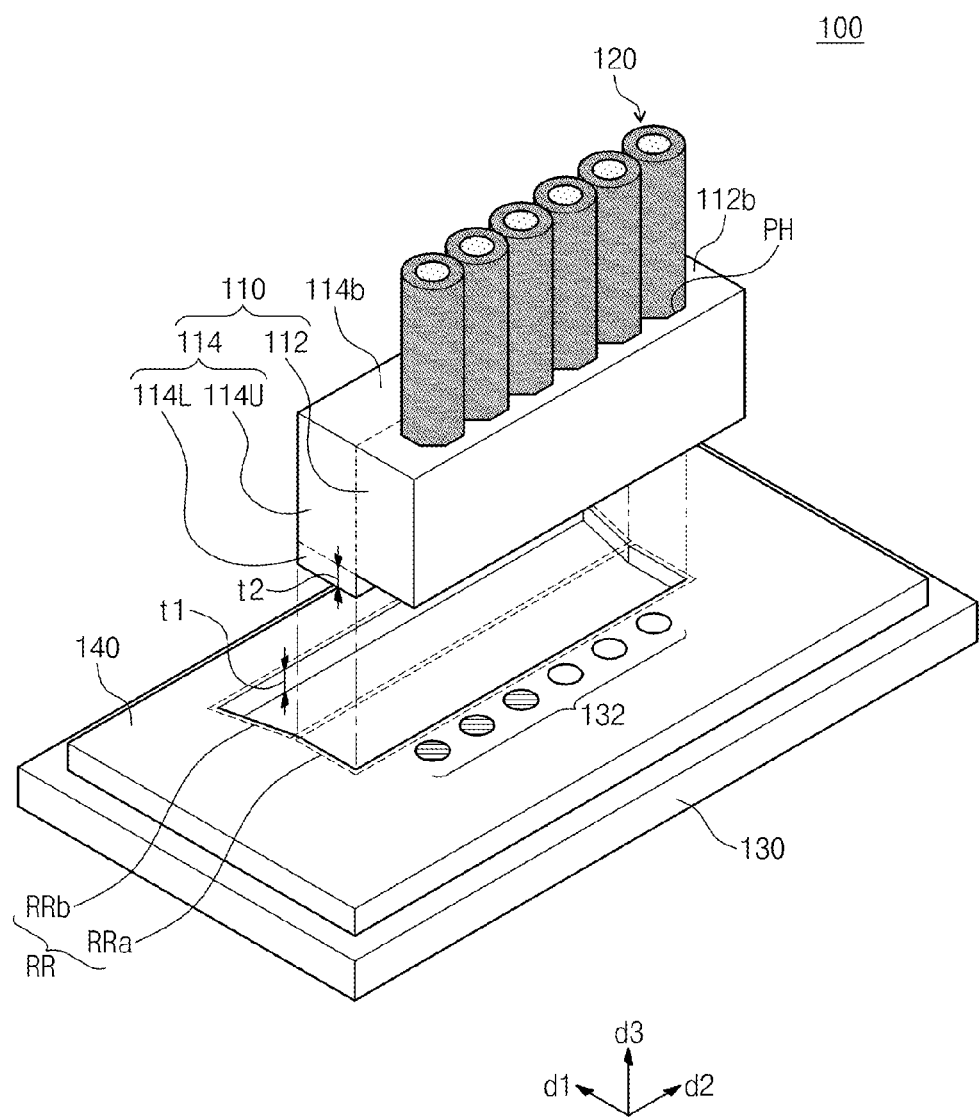
FIG. 1 is an exploded perspective view illustrating an optical coupling device according to an embodiment of the inventive concept.

Advantages and features of the inventive concept, and implementation methods thereof will be clarified through following embodiments described with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the inventive concept is only defined by scopes of claims. Like reference numbers refer to like elements throughout the entire specification.

In the following description, the technical terms are used only for explaining specific embodiments while not limiting the inventive concept. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Additionally, embodiments described in this specification will be described with plan views sectional views, that is, ideal exemplary views of the inventive concept. In the drawings, the thickness or size of each layer is exaggerated, omitted, or schematically illustrated for convenience in description and clarity. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. For example, an etched region illustrated as a rectangle may have rounded or curved features. Areas exemplified in the drawings have general properties, and are used to illustrate a specific shape of a semiconductor package region. Thus, this should not be construed as limited to the scope of the inventive concept.

Figure 2A:
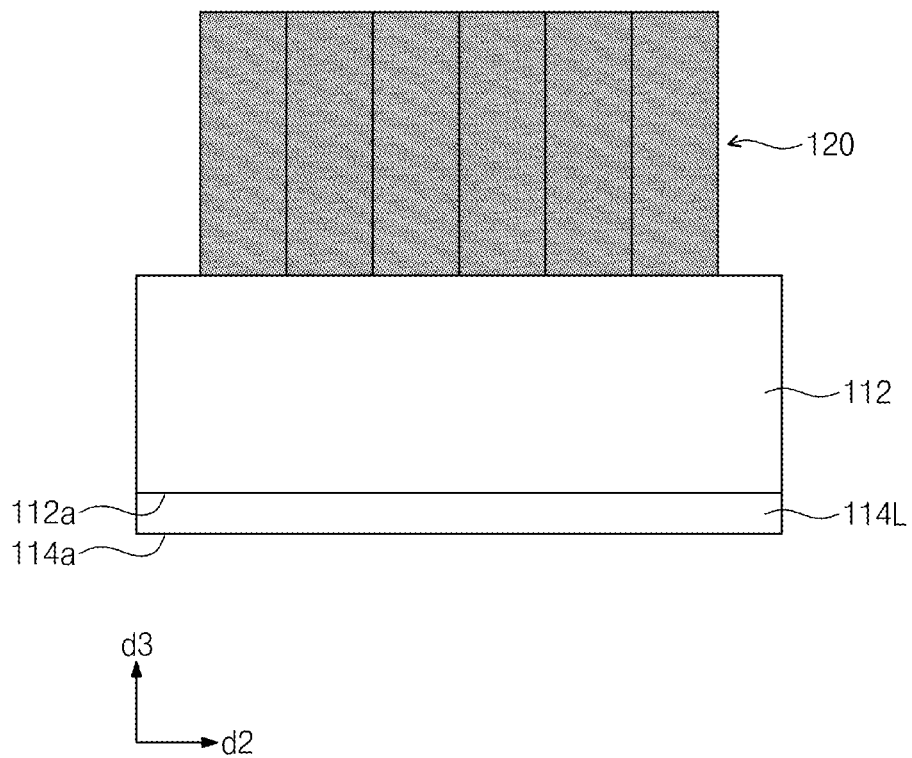
FIGS. 2A to 2C are a front view, a side view, and a bottom view, respectively, illustrating an optical fiber block and optical fibers included in an optical coupling device according to embodiments of the inventive concept.
Figure 2B:
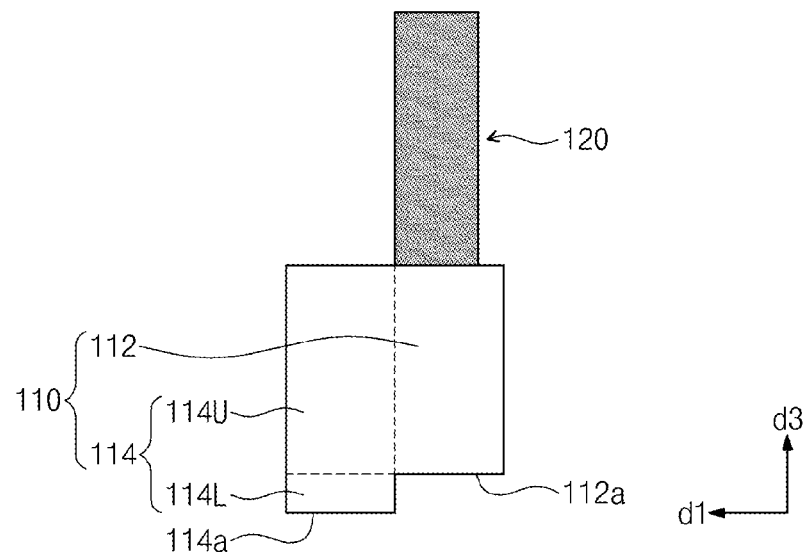
Figure 2C:
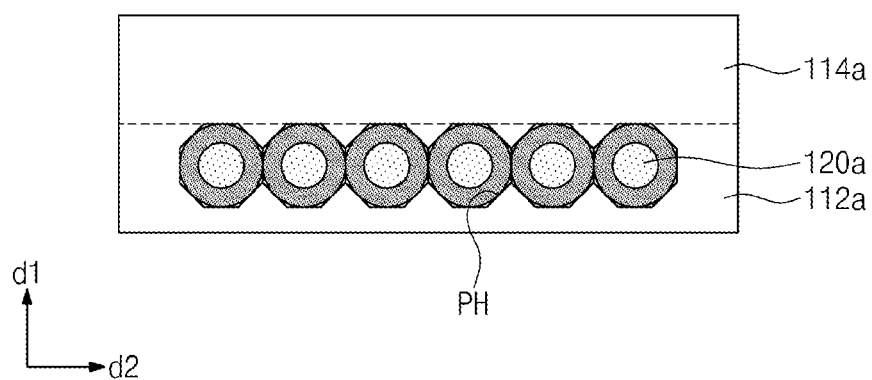
Figure 3A:
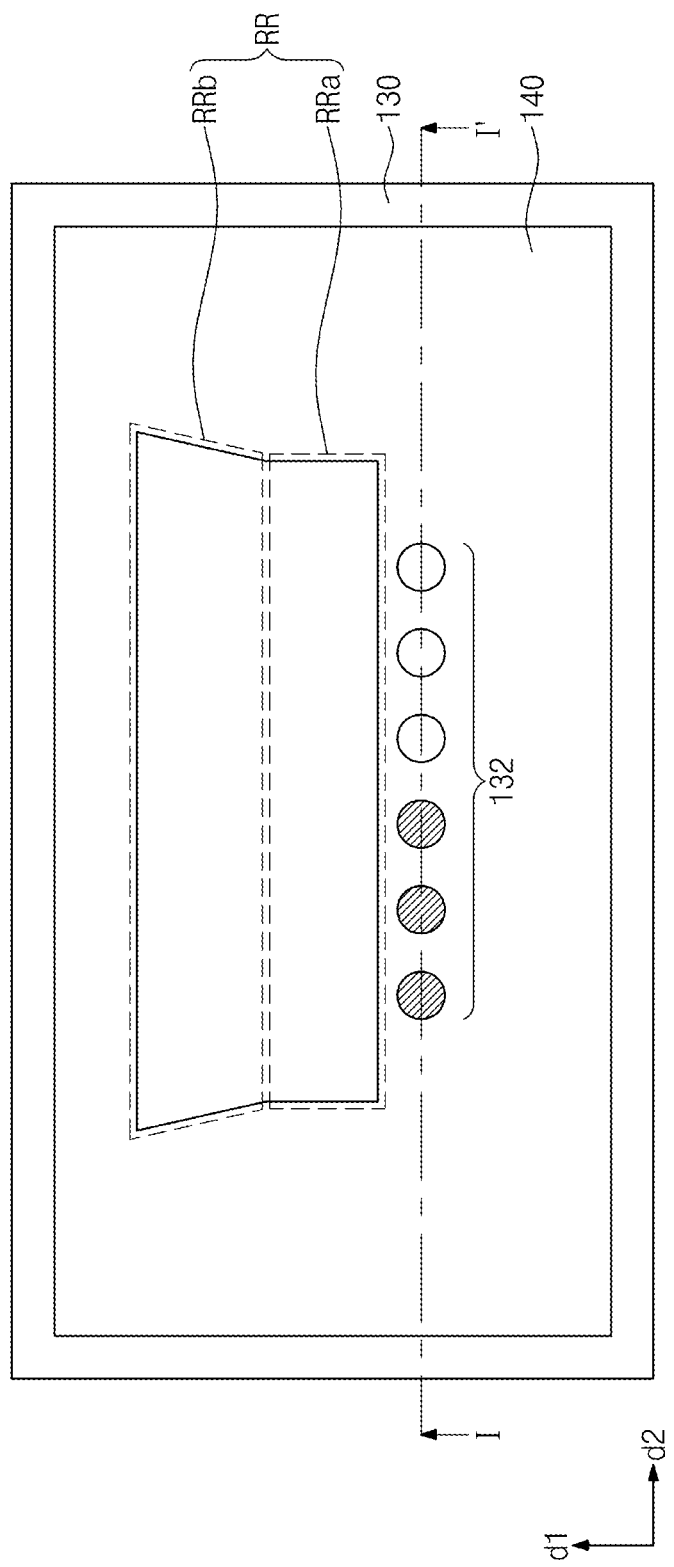
FIG. 3A is a plan view illustrating a semiconductor chip and a planarization layer included in an optical coupling device according to an embodiment of the inventive concept.

FIG. 1 is an exploded perspective view illustrating an optical coupling device according to an embodiment of the inventive concept. FIG. 2A is a front view illustrating an optical fiber block and optical fibers included in an optical coupling device according to an embodiment of the inventive concept. FIG. 2B is a side view illustrating an optical fiber block and optical fibers included in an optical coupling device according to an embodiment of the inventive concept. FIG. 2C is a bottom view illustrating an optical fiber block and optical fibers included in an optical coupling device according to an embodiment of the inventive concept. FIG. 3A is a plan view illustrating a semiconductor chip and a planarization layer included in an optical coupling device according to an embodiment of the inventive concept. FIG. 3B is a sectional view taken along a line I-I' of FIG. 3A.

Referring to FIG. 1, an optical coupling device 100 may include an optical fiber block 110, optical fibers 120, a semiconductor chip 130, and a planarization layer 140.

Referring to FIGS. 1, 2A, 2B, and 2C, the optical fiber block 110 may include a first block part 112 and a second block part 114. The first and second block parts 112 and 114 may be aligned along a first direction d1 and the second block part 114 may contact with one side of the first block part 112. The optical fiber block 110 may include at least one of stainless steel, polymer, or ceramic.

The first block part 112 may have penetration holes PH extending from the bottom surface 112a to the top surface 112b thereof. The penetration holes PH may be aligned along a second direction d2 intersecting (for example, vertical to) the first direction d1 and may be adjacent to the second block part 114. In a plan view, the penetration holes PH may have an octagonal, triangular, rectangular, or circular shape, but not be limited thereto. In some embodiments, as shown in FIGS. 1 and 2C, each penetration hole PH may contact with other penetration holes PH adjacent thereto. Unlike this, in other embodiments, the penetration holes PH may be spaced from each other.

The second block part 114 may contact with one side of the first block part 112. The bottom surface 114a of the second block part 114 may have a lower level than the bottom surface 112a of the first block part 112. Accordingly, the second block part 114 may include an upper portion 114U disposed at a higher level than the bottom surface 112a of the first block part 112 and a lower portion 114L disposed at a lower level than the bottom surface 112a of the second block part 112. For example, in a plan view, the lower portion 114L of the second block part 114 may have a rectangular shape but not limited thereto.

The optical fibers 120 may be received in the penetration holes PH and fixed. For example, the optical fibers 120 may penetrate the optical fiber block 110 in a third direction d3 intersecting (for example, vertical to) the first and second directions d1 and d2. One end surfaces 120a of the optical fibers 120 may have the same level as the bottom surface 112a of the first block part 112 and accordingly, may be exposed at the bottom surface 112a of the first block part 112. Each of the optical fibers 120 may extend along the third direction d3. As being received in the penetration holes PH, the optical fibers 120 may be aligned along the second direction d2. That is, the optical fibers 120 may constitute an optical fiber array aligned along the second direction d2. In some embodiments, as shown in FIGS. 1 and 2C, each optical fiber 120 may contact with other optical fibers 120 adjacent thereto. Unlike this, in other embodiments, the optical fibers 120 may be spaced from each other.

Referring to FIGS. 1, 3A, and 3B, the semiconductor chip 130 may be disposed below the optical fiber block 110. Accordingly, the top surface of the semiconductor chip 130 and the bottom surfaces 112a and 114a of the optical fiber block 110 may face each other. The semiconductor chip 130 may include a substrate and the substrate may include bulk silicon, Silicon On Insulator (SOI), or III-V compound semiconductor. The semiconductor chip 130 may have the optical input/output elements 132 disposed on the top surface thereof. The optical input/output elements 132 may be aligned along the second direction d2 in order to correspond with the one end surfaces 120a of the optical fibers 120. That is, the optical input/output elements 132 may constitute an optical input/output element array aligned along the second direction d2.

The optical input/output elements 132 may include different optical elements. For example, the optical input/output elements 132 may include first elements 133 and second elements 134. The first elements 133 may be optical input elements such as a PIN Photodiode (PIN PD) or an Avalanche Photodiode (APD) and the second elements 134 may be optical output elements such as a Vertical Cavity Surface Emitting Laser (VCSEL) or a Light Emitting Diode (LED). Unlike this, the optical input/output elements 132 may be a grating coupler. For example, when a substrate in the semiconductor chip 130 is a bulk Si substrate, the first elements 133 are a Ge-on-Si PD, and the second elements 134 are a VCSEL, the first elements 133 may be provided by epitaxially growing germanium (Ge) on the substrate and the second elements 134 may be provided by wafer-bonding a VCSEL on the substrate. In some embodiments, a level of the top surface of the first elements 133 and a level of the top surface of the second elements 134 may be different from each other. For example, the first elements 133 may have the top surfaces having a lower level than those of the second elements 134.

The planarization layer 140 may be disposed on the top surface of the semiconductor chip 130 to cover sidewalls of the optical input/output elements 132. According to some embodiments, the planarization layer 140 may expose the top surfaces of the optical input/output elements 132. Unlike this, according to some embodiments, the planarization layer 140 may cover the top surfaces of the optical input/output elements 132. When the optical input/output elements 132 include elements having different levels of top surfaces, the planarization layer 140 may expose the top surface of the highest level but cover the top surfaces of different levels. For example, when the first elements 133 have the top surfaces having a lower level than those of the second elements 134, the planarization layer 140 may cover the top surfaces of the first elements 133 and expose the top surfaces of the second elements 134. According to some embodiments, when the planarization layer 140 covers the top surfaces of the optical input/output elements 132, the planarization layer 140 on the optical input/output elements 132 may be replaced with an optical via pattern OV. For example, when the first elements 133 have the top surfaces having a lower level than those of the second elements 134, the optical via pattern OV may be provided on the first elements 133. The optical via pattern OV may include a material having a higher refractive index than that of the planarization layer 140.

The planarization layer 140 may have a recess region RR recessed from the top surface thereof. In a plan view, the recess region RR may be adjacent to the optical input/output elements 132 but may be spaced apart from the optical input/output elements 132. The recess region RR may include an alignment region RRa and an additional region RRb. The alignment region RRa may be a portion adjacent to the optical input/output elements 132 of the recess region RR. The alignment region RRa may have a structure engaging with the lower portion 114L of the second block part 114. For example, in a plan view, the alignment region RRa may have a rectangular shape but is not limited thereto. The additional region RRb may be a portion extending from the alignment region RRa in the first direction d1. In a plan view, the additional region RRb may have a tapered shape of which width becomes broader as it becomes far from the alignment region RRa (that is, as it goes in the first direction d1). The depth t1 of the recess region RR may be substantially identical to the thickness t2 of the lower portion 114L of the second block part 114. The depth t1 of the recess region RR, for example, may be several μm to several mm.

The planarization layer 140 may include a material having insulation and a high light transmittance in an optical communication wavelength band. For example, the planarization layer 140 may include at least one of a silicon oxide, a silicon nitride, a silicon oxynitride, or a polymer compound having photosensitivity (for example, photosensitive epoxy resin). The recess region RR may be formed by etching a portion of a preliminary planarization layer (not shown) deposited flat on the semiconductor chip 130. When the preliminary planarization layer (not shown) is photosensitive, the recess region RR may be formed by a photolithography process.

Figure 4:
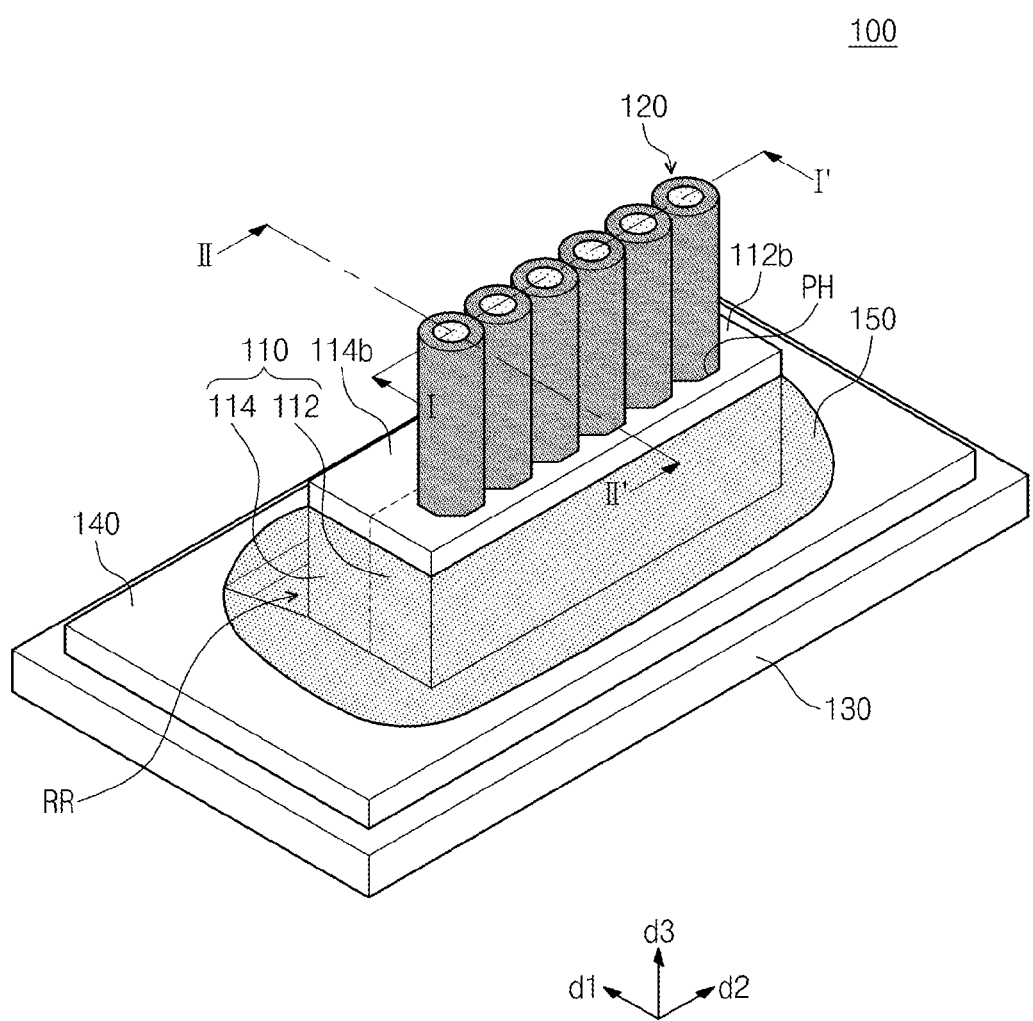
FIG. 4 is a coupling perspective view illustrating an optical coupling device according to an embodiment of the inventive concept.
Figure 5A:
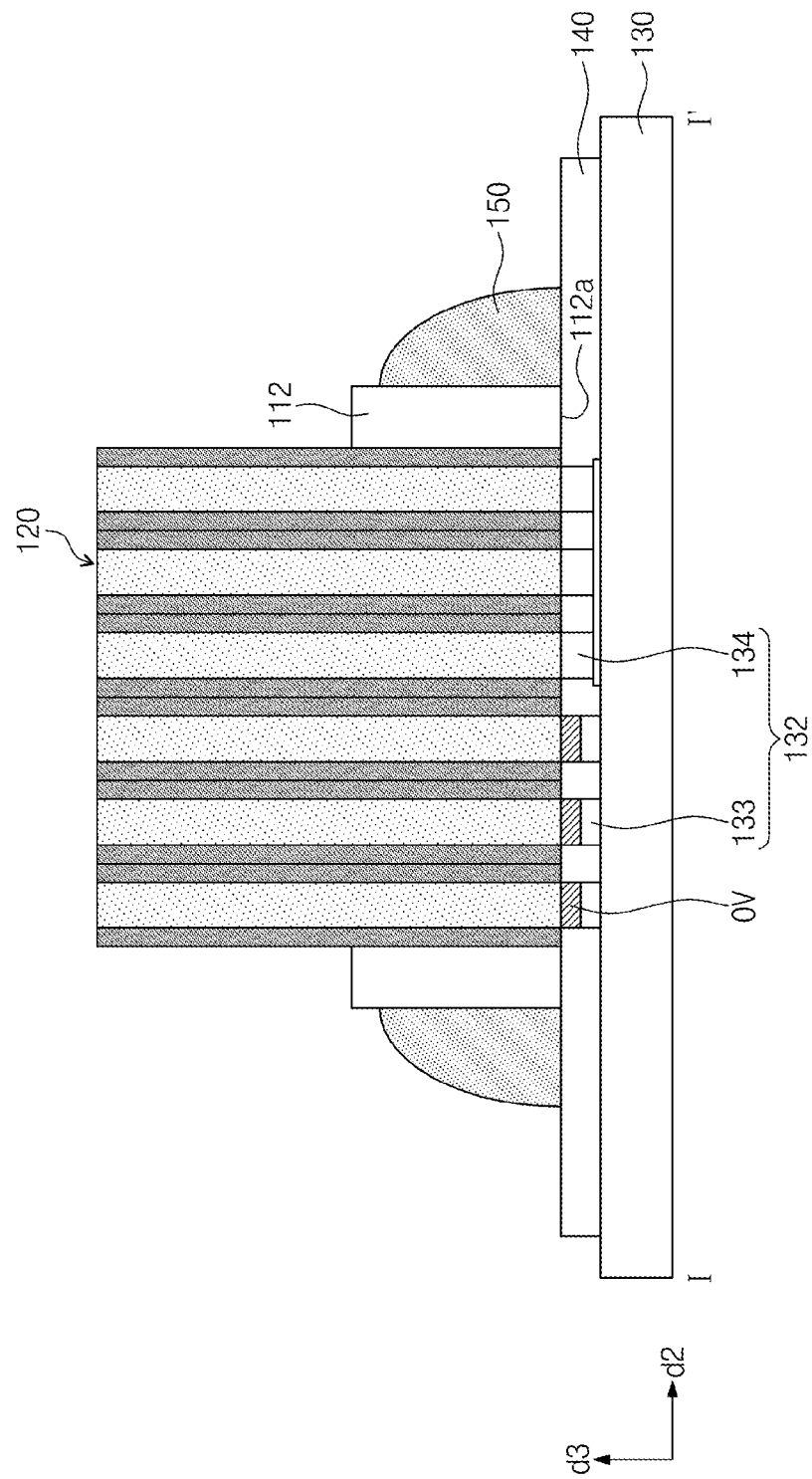
FIG. 5A is a sectional view taken along a line I-I' of FIG. 4.
Figure 5B:
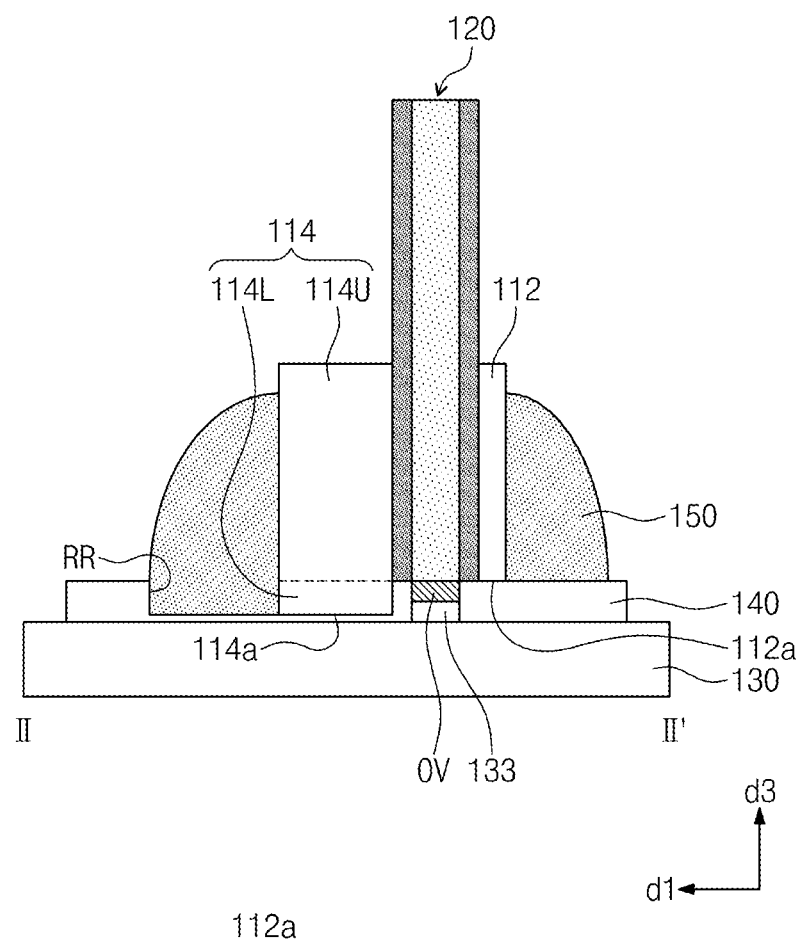
FIG. 5B is a sectional view taken along a line II-II' of FIG. 4.

FIG. 4 is a coupling perspective view illustrating an optical coupling device according to an embodiment of the inventive concept. FIG. 5A is a sectional view taken along a line I-I' of FIG. 4. FIG. 5B is a sectional view taken along a line II-II' of FIG. 4.

Referring to FIGS. 1, 2A to 2C, 3A, 3B, 4, 5A, and 5B, the optical fiber block 110 may be mounted on the planarization layer 140. The lower portion 114L of the second block part 114 may be inserted into the recess region RR, and may be coupled with the alignment region RRa. Coupling the lower portion 114L of the second block part 114 with the alignment region RRa may include inserting the lower portion 114L of the second block part 114 into the additional region RRb and pushing the inserted lower portion 114L toward the alignment region RRa. In a plan view since the additional region RRb has a tapered shape of which width becomes narrower as it becomes closer to the alignment region RRa, the lower portion 114L of the second block part 114 inserted to the additional region RRb may be easily coupled with the alignment region RRa. The bottom surface 114a of the lower portion 114L of the second block part 114 may contact with the bottom of the recess region RR.

Additionally, the inner sidewall of the alignment region RRa may contact with the sidewall of the lower portion 114L of the second block part 114. The bottom surface 112a of the first block part 112 may contact with the top surface of the planarization layer 140.

The optical fibers 120 and the optical input/output elements 132 may be optically coupled to each other. That is, in a plan view, each of the optical fibers 120 may overlap the optical input/output element 132 corresponding thereto. When the top surfaces of the optical input/output elements 132 are exposed, the one end surfaces 120a of the optical fibers 120 may contact with the top surfaces of the optical input/output elements 132. Unlike this, when the top surfaces of the optical input/output elements 132 are covered with the planarization layer 140, the one end surfaces 120a of the optical fibers 120 may be spaced from the top surfaces of the optical input/output elements 132. According to some embodiments, as shown in FIGS. 5A and 5B, the planarization layer 140 on the optical input/output elements 132 may be replaced with the optical via pattern OV. Accordingly, the one end surfaces 120a of the optical fibers 120 and the top surfaces of the optical input/output elements 132 may be optically connected by the optical via patterns OV. The optical via pattern OV may include a material having a higher refractive index than that of the planarization layer 140.

A fixing part 150 covering the sidewall of the optical fiber block 110 and the top surface of the planarization layer 140 may be further provided. The fixing part 150 may serve to fix the optical fiber block 110 mounted on the planarization layer 140. According to some embodiments, the fixing part 150 may fill the additional region RRb. The fixing part 150, for example, may include an adhesive material such as UV-cured epoxy resin.

In relation to the optical coupling device 100 according to an embodiment of the inventive concept, a passive optical coupling between the optical fibers 120 and the optical input/output elements 132 may be achieved by a physical structure of the optical fiber block 110 and the planarization layer 140. An additional guide pin and hole for the optical coupling are not required. Accordingly, the miniaturization of the optical coupling device 100 may be implemented. Additionally, an optical coupling process may be simplified and the manufacturing cost of the optical coupling device 100 may be reduced.

Figure 6:
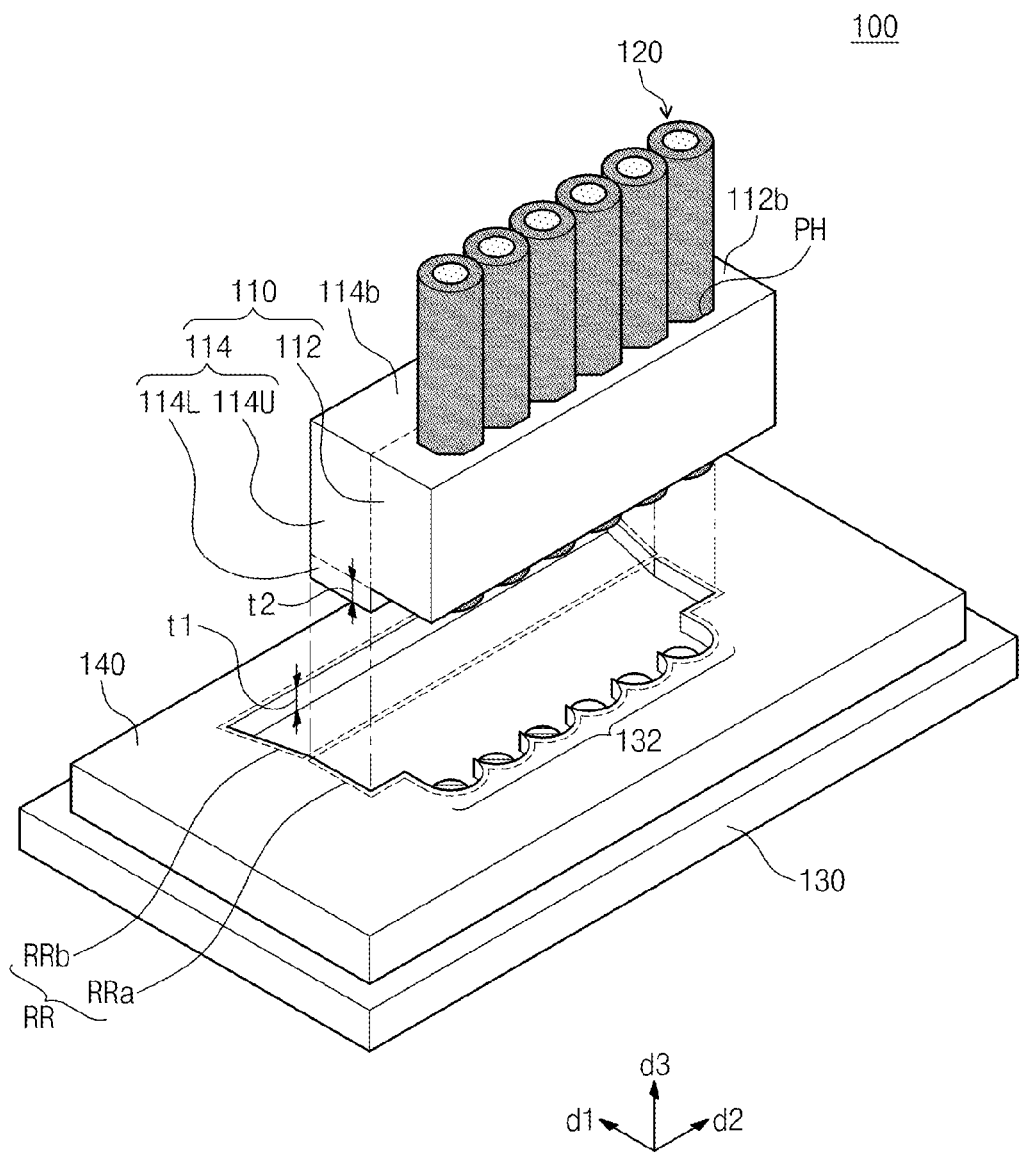
FIG. 6 is an exploded perspective view illustrating an optical coupling device according to another embodiment of the inventive concept.
Figure 7A:
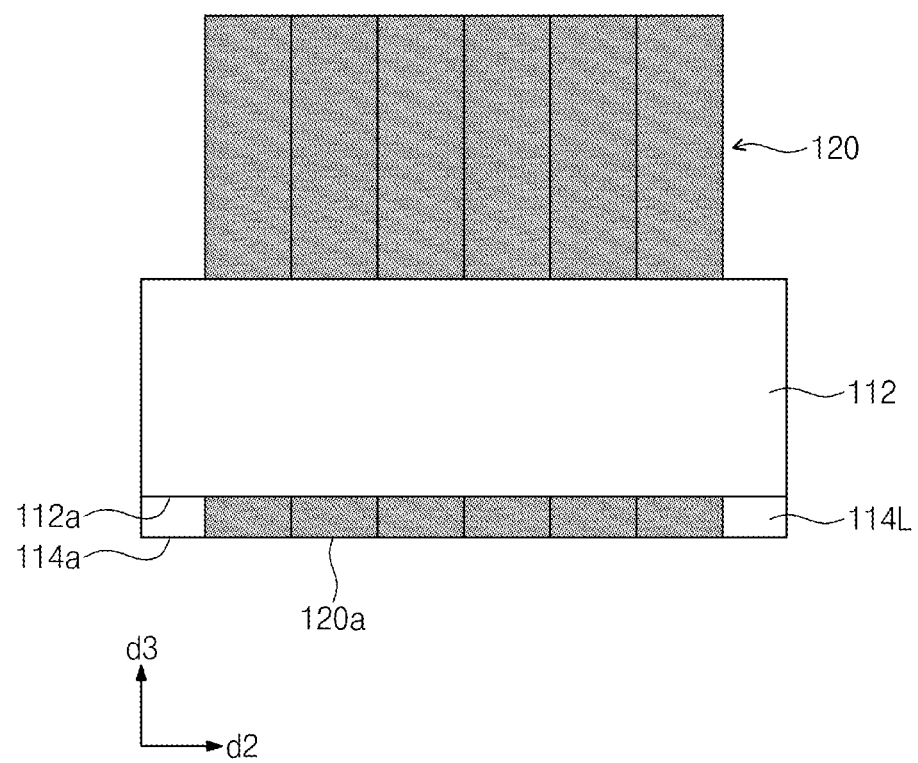
FIGS. 7A to 7C are a front view, a side view, and a bottom view, respectively, illustrating an optical fiber block and optical fibers included in an optical coupling device according to other embodiments of the inventive concept.
Figure 7B:
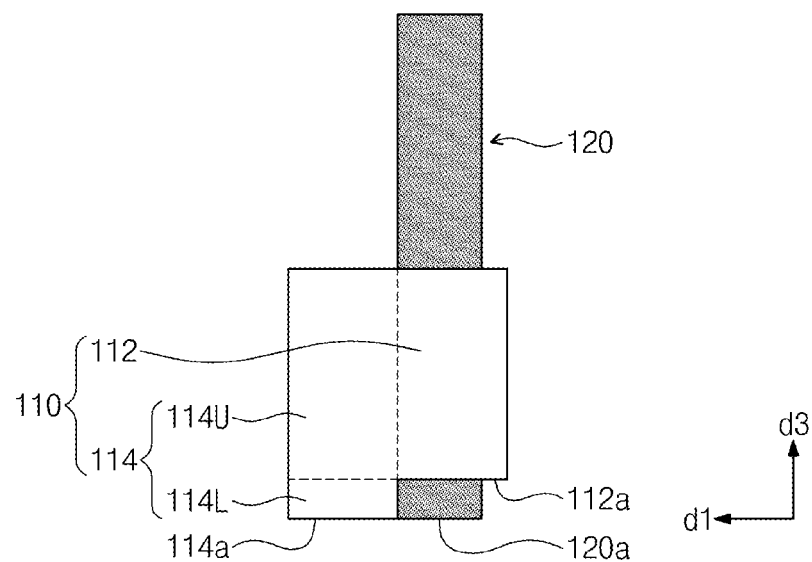
Figure 7C:
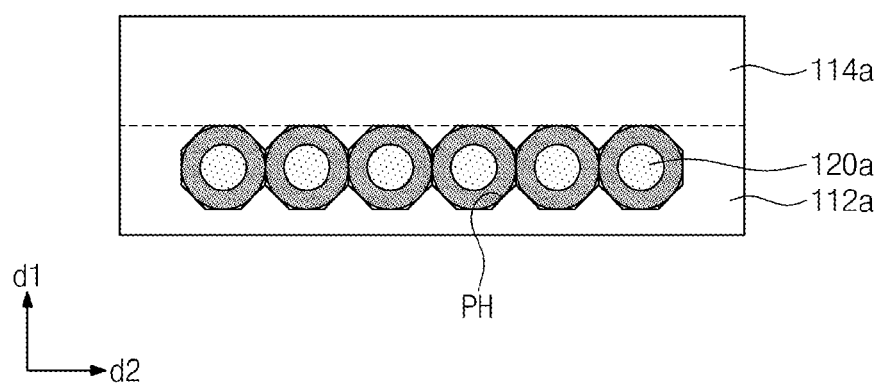
Figure 8A:
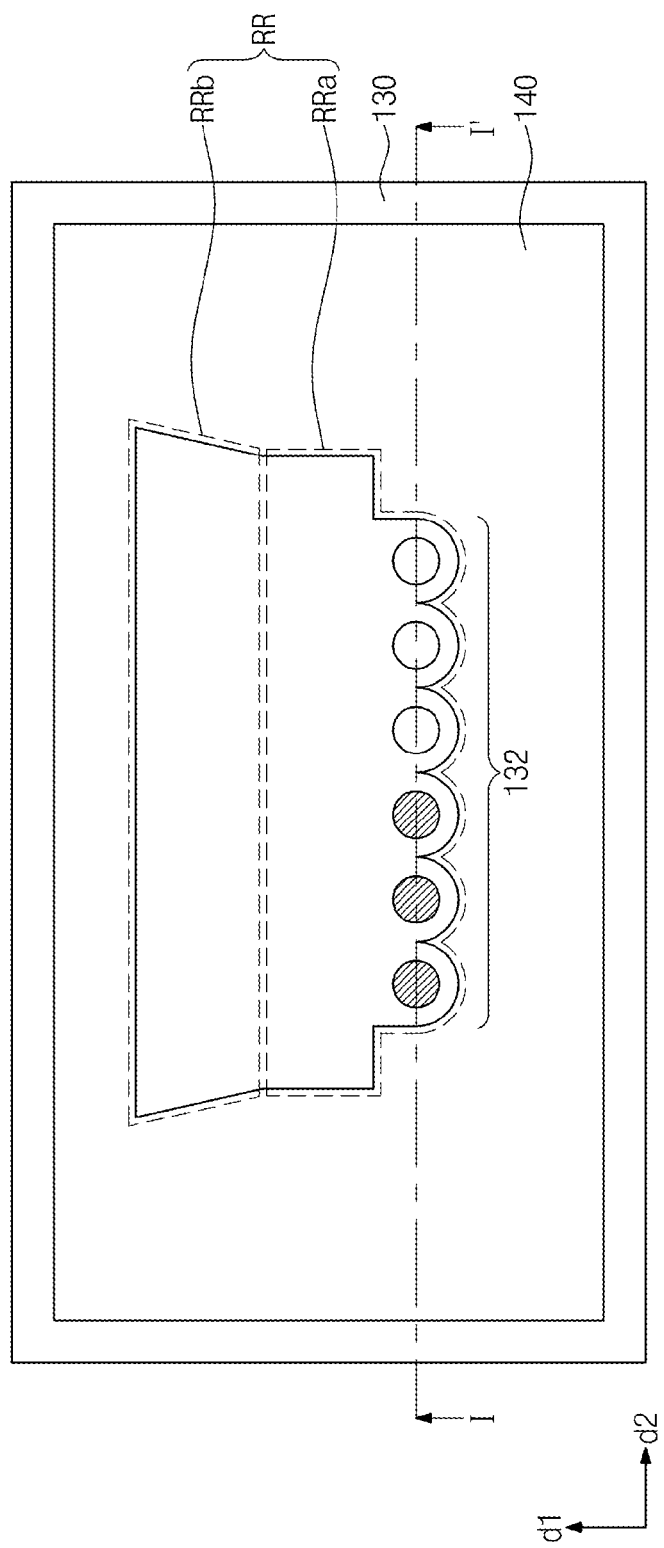
FIG. 8A is a plan view illustrating a semiconductor chip and a planarization layer included in an optical coupling device according to another embodiment of the inventive concept.
Figure 8B:
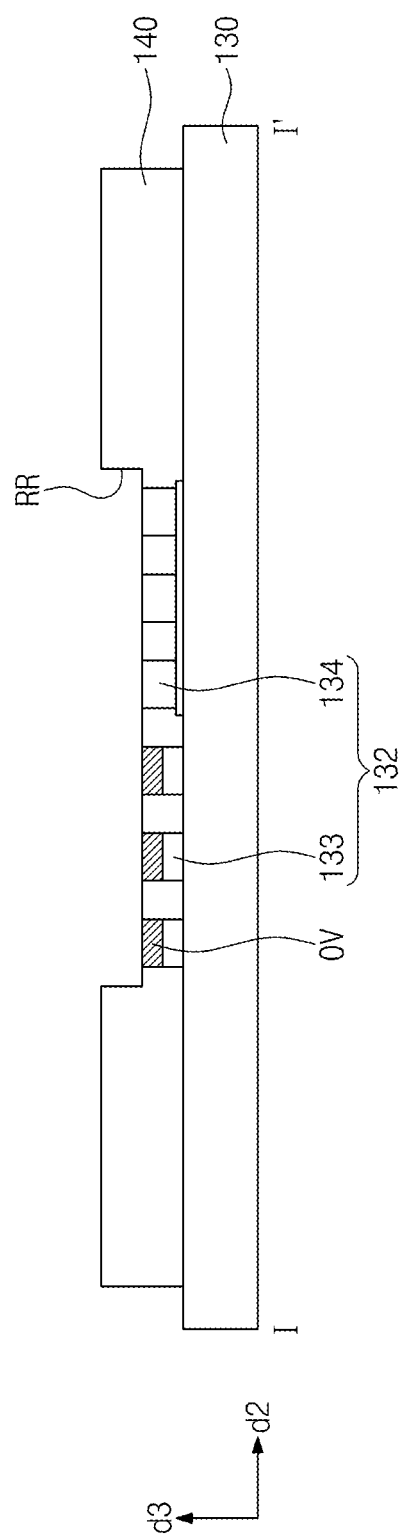
FIG. 8B is a sectional view taken along a line I-I' of FIG. 8A.

FIG. 6 is an exploded perspective view illustrating an optical coupling device according to another embodiment of the inventive concept. FIG. 7A is a front view illustrating an optical fiber block and optical fibers included in an optical coupling device according to another embodiment of the inventive concept. FIG. 7B is a side view illustrating an optical fiber block and optical fibers included in an optical coupling device according to another embodiment of the inventive concept. FIG. 7C is a bottom view illustrating an optical fiber block and optical fibers included in an optical coupling device according to another embodiment of the inventive concept. FIG. 8A is a plan view illustrating a semiconductor chip and a planarization layer included in an optical coupling device according to another embodiment of the inventive concept. FIG. 8B is a sectional view taken along a line I-I' of FIG. 8A.

Referring to FIG. 6, an optical coupling device 101 may include an optical fiber block 110, optical fibers 120, a semiconductor chip 130, and a planarization layer 140.

Referring to FIGS. 6, 7A, 7B, and 7C, the optical fiber block 110 may include a first block part 112 and a second block part 114. The first and second block parts 112 and 114 may be aligned along a first direction d1 and the second block part 114 may contact with one side of the first block part 112. The optical fiber block 110 may include at least one of stainless steel, polymer, or ceramic.

The optical fiber block 110 may have penetration holes PH extending from the bottom surfaces 112a and 114a to the top surfaces 112b and 114b thereof. The through holes PH, for example, may extend from the bottom surface 112a of the first block part 112 to the top surface 112b but not limited thereto. The penetration holes PH may be aligned along a second direction d2 intersecting (for example, vertical to) the first direction d1. In a plan view, the penetration holes PH may have an octagonal, triangular, rectangular, or circular shape, but not limited thereto. In some embodiments, as shown in FIGS. 6 and 7C, each penetration hole PH may contact with other penetration holes PH adjacent thereto. Unlike this, in other embodiments, the penetration holes PH may be spaced from each other.

The second block part 114 may contact with one side of the first block part 112. The bottom surface 114a of the second block part 114 may have a lower level than the bottom surface 112a of the first block part 112. Accordingly, the second block part 114 may include an upper portion 114U disposed at a higher level than the bottom surface 112a of the first block part 112 and a lower portion 114L disposed at a lower level than the bottom surface 112a of the second block part 112. For example, in a plan view, the lower portion 114L of the second block part 114 may have a rectangular shape but not limited thereto.

The optical fibers 120 may be received in the penetration holes PH and fixed. For example, the optical fibers 120 may penetrate the optical fiber block 110 in a third direction d3 intersecting (for example, vertical to) the first and second directions d1 and d2. One end surfaces 120a of the optical fibers 120 may have the same level as the bottom surface 114a of the second block part 114 and accordingly, may be exposed at the bottom surfaces 112a and 114a of the optical fiber block 110. When the penetration holes PH penetrate the first block part 112, a portion of the optical fibers 120 may protrude from the bottom surface 112a of the first block part 112. Each of the optical fibers 120 may extend along the third direction d3. As being received in the penetration holes PH, the optical fibers 120 may be aligned along the second direction d2. That is, the optical fibers 120 may constitute an optical fiber array aligned along the second direction d2. In some embodiments, as shown in FIGS. 6 and 7C, each optical fiber 120 may contact with other optical fibers 120 adjacent thereto. Unlike this, in other embodiments, the optical fibers 120 may be spaced from each other.

Referring to FIGS. 6, 8A, and 8B, the semiconductor chip 130 may be disposed below the optical fiber block 110. Accordingly, the top surface of the semiconductor chip 130 and the bottom surfaces 112a and 114a of the optical fiber block 110 may face each other. The semiconductor chip 130 may include a substrate and the substrate may include bulk silicon, Silicon On Insulator (SOI), or III-V compound semiconductor. The semiconductor chip 130 may have the optical input/output elements 132 disposed on the top surface thereof. The optical input/output elements 132 may be aligned along the second direction d2 in order to correspond to the one end surfaces 120a of the optical fibers 120. That is, the optical input/output elements 132 may constitute an optical input/output element array aligned along the second direction d2.

The optical input/output elements 132 may include different optical elements. For example, the optical input/output elements 132 may include first elements 133 and second elements 134. The first elements 133 may be optical input elements such as a PIN Photodiode (PIN PD) or an Avalanche Photodiode (APD) and the second elements 134 may be optical output elements such as a Vertical Cavity Surface Emitting Laser (VCSEL) or a Light Emitting Diode (LED). Unlike this, the optical input/output elements 132 may be a grating coupler. For example, when a substrate in the semiconductor chip 130 is a bulk Si substrate, the first elements 133 are a Ge-on-Si PD, and the second elements 134 are a VCSEL, the first elements 133 may be provided by epitaxially growing germanium (Ge) on the substrate and the second elements 134 may be provided by wafer-bonding a VCSEL on the substrate. In some embodiments, a level of the top surface of the first elements 133 and a level of the top surface of the second elements 134 may be different from each other. For example, the first elements 133 may have the top surfaces having a lower level than those of the second elements 134.

The planarization layer 140 may be disposed on the top surface of the semiconductor chip 130 to cover sidewalls of the optical input/output elements 132. According to some embodiments, the planarization layer 140 may expose the top surfaces of the optical input/output elements 132. Unlike this, according to some embodiments, the planarization layer 140 may cover the top surfaces of the optical input/output elements 132. When the optical input/output elements 132 include elements having different levels of top surfaces, the planarization layer 140 may expose the top surface of the highest level but cover the top surfaces of different levels. For example, when the first elements 133 have the top surfaces having a lower level than those of the second elements 134, the planarization layer 140 may cover the top surfaces of the first elements 133 and expose the top surfaces of the second elements 134. According to some embodiments, when the planarization layer 140 covers the top surfaces of the optical input/output elements 132, the planarization layer 140 on the optical input/output elements 132 may be replaced with an optical via pattern OV. For example, when the first elements 133 have the top surfaces having a lower level than those of the second elements 134, the optical via pattern OV may be provided on the first elements 133. The optical via pattern OV may include a material having a higher refractive index than that of the planarization layer 140.

The planarization layer 140 may have a recess region RR recessed from the top surface thereof. In a plan view, the recess region RR may overlap the optical input/output elements 132. The recess region RR may include an alignment region RRa and an additional region RRb. The alignment region RRa may include a portion that vertically overlaps the optical input/output elements 132 of the recess region RR. The alignment region RRa may have a structure engaging with a portion of the optical fibers 120 protruding from the bottom surface 112a of the first block part 112 and the lower portion 114L of the second block part 114. The additional region RRb may be a portion extending from the alignment region RRa in the first direction d1. In a plan view, the additional region RRb may have a tapered shape of which width becomes broader as it becomes far from the alignment region RRa (that is, as it goes in the first direction d1). The depth t1 of the recess region RR may be substantially identical to the thickness t2 of the lower portion 114L of the second block part 114. The depth t1 of the recess region RR, for example, may be several μm to several mm.

The planarization layer 140 may include a material having insulation and a high light transmittance in an optical communication wavelength band. For example, the planarization layer 140 may include at least one of a silicon oxide, a silicon nitride, a silicon oxynitride, or a polymer compound having photosensitivity (for example, photosensitive epoxy resin). The recess region RR may be formed by etching a portion of a preliminary planarization layer (not shown) deposited flat on the semiconductor chip 130. When the preliminary planarization layer (not shown) is photosensitive, the recess region RR may be formed by a photolithography process.

Figure 9:
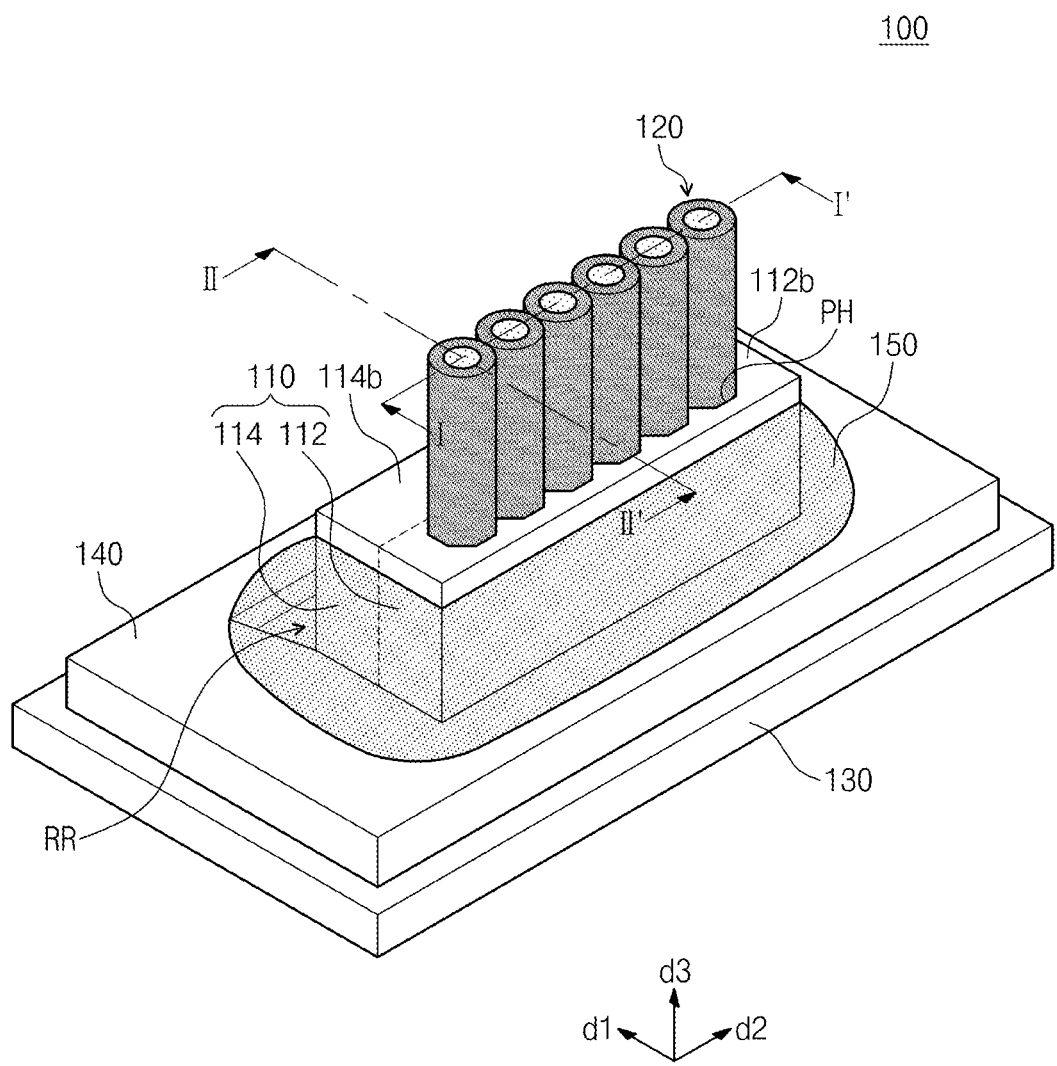
FIG. 9 is a coupling perspective view illustrating an optical coupling device according to another embodiment of the inventive concept.
Figure 10A:
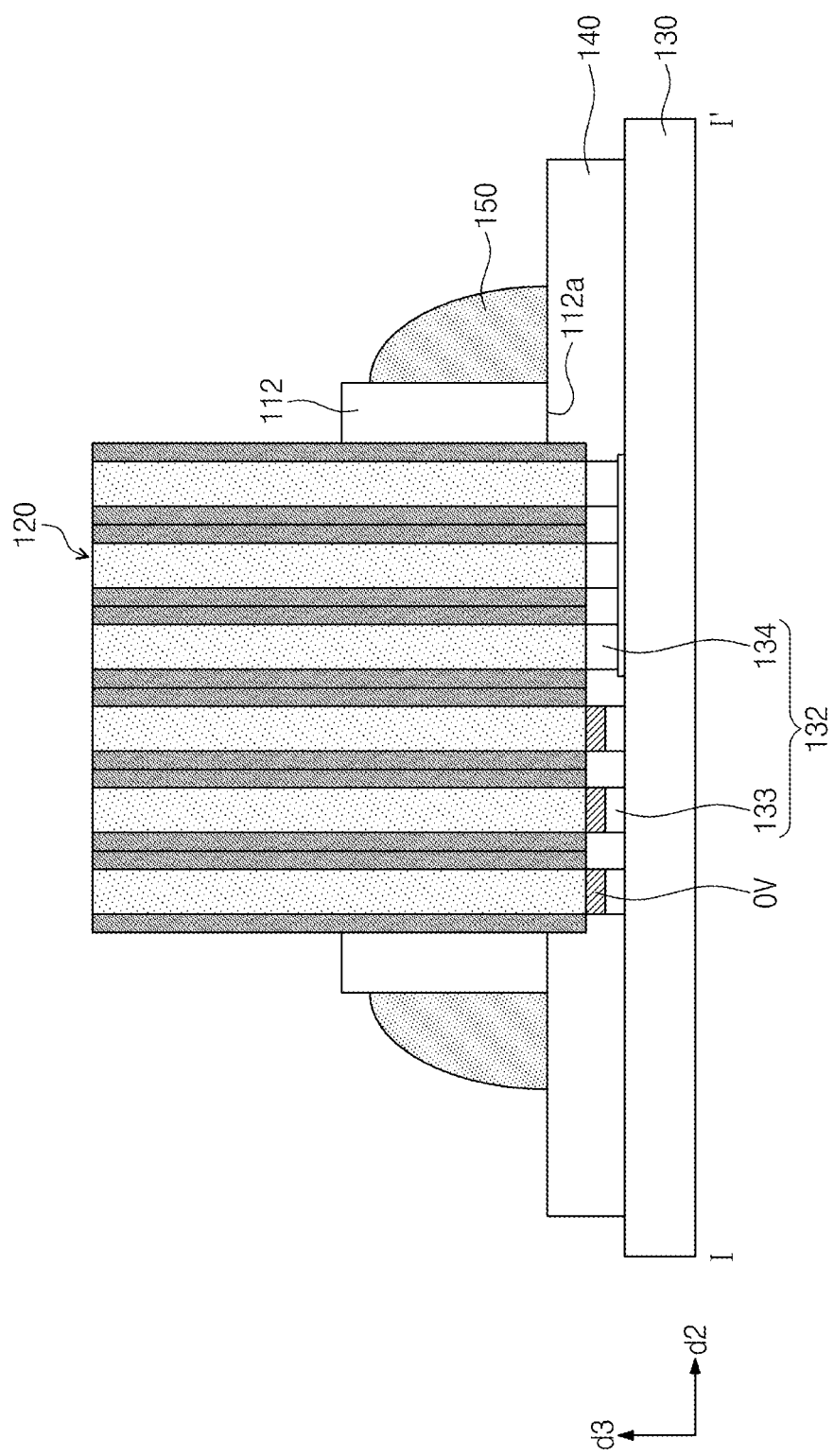
FIG. 10A is a sectional view taken along a line I-I' of FIG. 9.
Figure 10B:
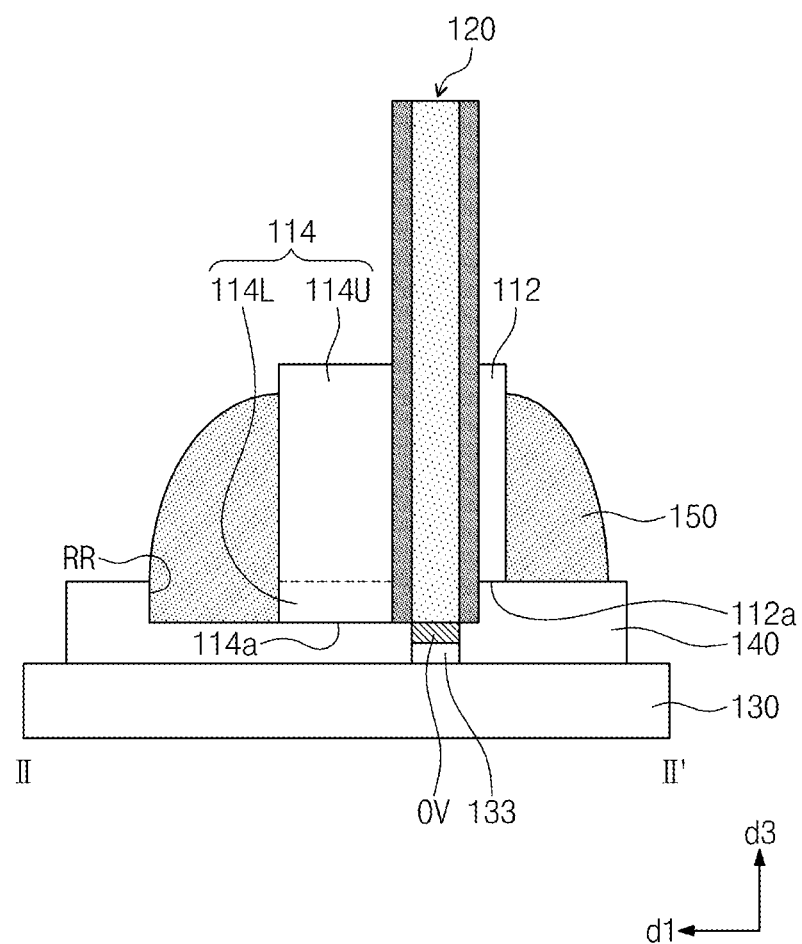
FIG. 10B is a sectional view taken along a line II-II' of FIG. 9.

FIG. 9 is a coupling perspective view illustrating an optical coupling device according to another embodiment of the inventive concept. FIG. 10A is a sectional view taken along a line I-I' of FIG. 9. FIG. 10B is a sectional view taken along a line II-II' of FIG. 9.

Referring to FIGS. 6, 7A to 7C, 8A, 8B, 9, 10A, and 10B, the optical fiber block 110 may be mounted on the planarization layer 140. A portion of the optical fibers 120 protruding from the bottom surface 112a of the first block part 112 and the lower portion 114L of the second block part 114 may be inserted into the recess region RR and may be coupled with the alignment region RRa. Coupling the portion of the optical fibers 120 protruding from the bottom surface 112a of the first block part 112 and the lower portion 114L of the second block part 114 may include inserting the portion of the optical fibers 120 protruding from the bottom surface 112a of the first block part 112 and the lower portion 114L of the second block part 114 into the additional region RRb and pushing the inserted lower portion 114L toward the alignment region RRa. In a plan view, since the additional region RRb has a tapered shape of which width becomes narrower as it becomes closer to the alignment region RRa, the lower portion 114L of the second block part 114 inserted to the additional region RRb and a portion of the optical fibers 120 protruding from the bottom surface 112a of the first block part 112 may be easily coupled with the alignment region RRa. The bottom surface 114a of the lower portion 114L of the second block part 114 may contact with the bottom of the recess region RR. Additionally, the inner sidewall of the alignment region RRa may contact with the sidewall of the lower portion 114L of the second block part 114 and the sidewall of the optical fibers 120 protruding from the bottom surface 112a of the first block part 112. The bottom surface 112a of the first block part 112 may contact with the top surface of the planarization layer 140.

The optical fibers 120 and the optical input/output elements 132 may be optically coupled to each other. That is, in a plan view, each of the optical fibers 120 may overlap the optical input/output element 132 corresponding thereto. When the top surfaces of the optical input/output elements 132 are exposed, the one end surfaces 120a of the optical fibers 120 may contact with the top surfaces of the optical input/output elements 132. Unlike this, when the top surfaces of the optical input/output elements 132 are covered with the planarization layer 140, the one end surfaces 120a of the optical fibers 120 may be spaced from the top surfaces of the optical input/output elements 132. According to some embodiments, as shown in FIGS. 10A and 10B, the planarization layer 140 on the optical input/output elements 132 may be replaced with the optical via pattern OV. Accordingly, the one end surfaces 120a of the optical fibers 120 and the top surfaces of the optical input/output elements 132 may be optically connected by the optical via patterns OV. The optical via pattern OV may include a material having a higher refractive index than that of the planarization layer 140.

A fixing part 150 for fixing the optical fiber block 110 mounted on the planarization layer 140 may be further provided. The fixing part 150 may cover the sidewall of the optical fiber block 110 and the top surface of the planarization layer 140. According to some embodiments, the fixing part 150 may fill the additional region RRb. The fixing part 150, for example, may include an adhesive material such as UV-cured epoxy resin.

In relation to the optical coupling device 101 according to an embodiment of the inventive concept, an optical coupling between the optical fibers 120 and the optical input/output elements 132 may be achieved by using a physical structure of the optical fiber block 110 and the planarization layer 140. An additional guide pin and hole for the optical coupling are not required. Accordingly, the miniaturization of the optical coupling device 100 may be implemented. Additionally, an optical coupling process may be simplified and the manufacturing cost of the optical coupling device 100 may be reduced.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An optical coupling device comprising:
    an optical fiber block including a first block part and a second block part contacting one side of the first block part;
    an optical fiber penetrating the optical fiber block and having an end surface exposed at a bottom surface of the optical fiber block;
    a semiconductor chip disposed below the optical fiber block, the semiconductor chip having a top surface on which an optical input/output element is disposed such that the optical input/output element corresponds to the end surface of the optical fiber; and
    a planarization layer disposed on the top surface of the semiconductor chip and having a recess region,
    wherein a bottom surface of the first block part has a higher level than a bottom surface of the second block part from a bottom surface of the semiconductor chip, the bottom surface of the second block part contacts a bottom of the recess region, and the optical fiber is optically coupled with the optical input/output element, and
    wherein the second block part comprises an upper portion disposed at a higher level than the bottom surface of the first block part.

2. The optical coupling device of claim 1, wherein the optical fiber penetrates the first block part and the end surface of the optical fiber has the same level as the bottom surface of the first block part.

3. The optical coupling device of claim 2, wherein the optical input/output element is adjacent to the recess region and spaced apart from the recess region, in a plan view.

4. The optical coupling device of claim 2, wherein second block part further comprises:
    a lower portion disposed at a lower level than the bottom surface of the first block part,
    wherein the recess region comprises an alignment region having a structure engaging with the lower portion of the second block part.

5. The optical coupling device of claim 4, wherein an inner sidewall of the alignment region contacts a sidewall of the lower portion of the second block part.

6. The optical coupling device of claim 4, wherein the recess region further comprises an additional region extending from the alignment region, and
    wherein the additional region has a tapered shape such that a width of the additional region increases as it extends from the alignment region, in a plan view.

7. The optical coupling device of claim 1, wherein the end surface of the optical fiber has the same level as the bottom surface of the second block part.

8. The optical coupling device of claim 7, wherein the optical input/output element overlaps with the recess region, in a plan view.

9. The optical coupling device of claim 7, wherein the second bock part further comprises:
    a lower portion disposed at a lower level than the bottom surface of the first block part,
    wherein the recess region comprises an alignment region having a structure engaging with the lower portion of the second block part and a portion of the optical fiber protruding from the bottom surface of the first block part.

10. The optical coupling device of claim 9, wherein an inner sidewall of the alignment region contacts a sidewall of the lower portion of the second block part and a sidewall of the optical fiber.

11. The optical coupling device of claim 9, wherein the recess region further comprises an additional region extending from the alignment region, and
    wherein the additional region has a tapered shape such that a width of the additional region increases as it extends from the alignment region, in a plan view.

12. The optical coupling device of claim 1, wherein the bottom surface of the first block part contacts a top surface of the planarization layer.

13. The optical coupling device of claim 1, wherein the end surface of the optical fiber contacts the optical input/output element.

14. The optical coupling device of claim 1, further comprising an optical via pattern disposed between the end surface of the optical fiber and the optical input/output element, wherein the optical via pattern comprises a material having a higher refractive index than that of the planarization layer.

15. The optical coupling device of claim 1, wherein the second block part further comprises:
    a lower portion disposed at a lower level than the bottom surface of the first block part,
    wherein the lower portion is inserted into the recess region.

16. The optical coupling device of claim 15, wherein at least a portion of a sidewall of the lower portion contacts an inner sidewall of the recess region.

17. The optical coupling device of claim 1, further comprising a fixing part covering a top surface of the planarization layer and a sidewall of the optical fiber block.

18. The optical coupling device of claim 1, wherein the optical fiber is a first optical fiber and the optical input/output element is a first optical input/output element, the device further comprising a second optical fiber and a second optical input/output element,
    wherein an optical fiber array includes the first and second optical fibers that are arranged in a line, and an optical input/output element array includes the first and second optical input/output elements corresponding to the first and second optical fibers, respectively.

19. An optical coupling device comprising:
an optical fiber block including a first block part and a second block part contacting one side of the first block part;
an optical fiber penetrating the optical fiber block and having an end surface exposed at a bottom surface of the optical fiber block;
a semiconductor chip disposed below the optical fiber block, the semiconductor chip having a top surface on which an optical input/output element is disposed such that the optical input/output element corresponds to the end surface of the optical fiber; and
a planarization layer disposed on the top surface of the semiconductor chip and having a recess region,
wherein a bottom surface of the first block part has a higher level than a bottom surface of the second block part from a bottom surface of the semiconductor chip, the bottom surface of the second block part contacts a bottom of the recess region, and the optical fiber is optically coupled with the optical input/output element, and wherein the end surface of the optical fiber has the same level as the bottom surface of the first block part.

20. An optical coupling device comprising:
an optical fiber block including a first block part and a second block part directly contacting one side of the first block part;
an optical fiber penetrating the optical fiber block and having an end surface exposed at a bottom surface of the optical fiber block;
a semiconductor chip disposed below the optical fiber block, the semiconductor chip having a top surface on which an optical input/output element is disposed such that the optical input/output element corresponds to the end surface of the optical fiber; and
a planarization layer disposed on the top surface of the semiconductor chip and having a recess region,
wherein a bottom surface of the first block part has a higher level than a bottom surface of the second block part from a bottom surface of the semiconductor chip, the bottom surface of the second block part contacts a bottom of the recess region, and the optical fiber is optically coupled with the optical input/output element.

* * * * *